(12) United States Patent
Huang

(10) Patent No.: US 7,657,024 B2
(45) Date of Patent: Feb. 2, 2010

(54) PROGRAMMABLE WIRELESS HEADSET SYSTEM FOR CORDLESS TELEPHONE

(76) Inventor: Lei Huang, 2112 Stover St., Fort Collins, CO (US) 80525

( * ) Notice: Subject to any disclaimer, the term of this patent is extended or adjusted under 35 U.S.C. 154(b) by 294 days.

(21) Appl. No.: 11/308,628

(22) Filed: Apr. 14, 2006

(65) Prior Publication Data

US 2007/0243909 A1   Oct. 18, 2007

(51) Int. Cl.
 *H04M 1/00* (2006.01)
(52) U.S. Cl. .................. 379/428.02; 379/174; 379/430; 381/376; 455/74; 455/418; 455/419; 455/420; 455/575.2
(58) Field of Classification Search .................. 379/174, 379/428.02, 430; 381/376; 455/74, 418–420, 455/575.2
See application file for complete search history.

(56) References Cited

U.S. PATENT DOCUMENTS

| 5,590,417 | A |   | 12/1996 | Rydbeck |   |
|---|---|---|---|---|---|
| 5,915,026 | A | * | 6/1999 | Mankovitz | ................. 713/168 |
| 5,991,637 | A | * | 11/1999 | Mack et al. | ................. 455/563 |
| 6,006,115 | A | * | 12/1999 | Wingate | ................. 455/575.2 |
| 6,078,825 | A |   | 6/2000 | Hahn et al. |   |
| 6,236,969 | B1 | * | 5/2001 | Ruppert et al. | ................ 704/275 |
| 6,343,217 | B1 | * | 1/2002 | Borland | ................. 455/462 |
| 6,658,267 | B1 |   | 12/2003 | Baranowski |   |
| 6,795,718 | B2 |   | 9/2004 | Bae |   |
| 6,856,817 | B2 | * | 2/2005 | Tischler | ................. 455/569.1 |
| 2002/0076060 | A1 | * | 6/2002 | Hall et al. | ................. 381/74 |
| 2002/0097849 | A1 | * | 7/2002 | Berthoud et al. | ......... 379/90.01 |
| 2002/0111197 | A1 | * | 8/2002 | Fitzgerald | ................. 455/568 |
| 2002/0115479 | A1 | * | 8/2002 | Tischler | ................. 455/568 |
| 2003/0083024 | A1 | * | 5/2003 | Richenstein et al. | ......... 455/99 |
| 2004/0141610 | A1 | * | 7/2004 | Ying et al. | ............. 379/428.01 |
| 2005/0239450 | A1 | * | 10/2005 | Wesby | ................. 455/418 |
| 2007/0004473 | A1 | * | 1/2007 | Clark et al. | ............. 455/575.2 |
| 2007/0087780 | A1 | * | 4/2007 | Nassimi | ................. 455/556.1 |
| 2007/0190966 | A1 | * | 8/2007 | Awiszus | ................. 455/403 |
| 2008/0080703 | A1 | * | 4/2008 | Penning et al. | ........ 379/428.02 |

* cited by examiner

*Primary Examiner*—Hemant Patel
(74) *Attorney, Agent, or Firm*—Ancel W. Lewis, Jr.

(57) ABSTRACT

A wireless headset system includes a headset and a programming device. The programming device can be in the headset or in a base that is connectable to the headset. The headset has programmable device and a transceiver. The base has a programming device. The programming device programs the programmable device in the headset to control the transceiver to communicate directly with any cordless telephone base station, allowing hands free use of the telephone.

17 Claims, 3 Drawing Sheets

PROGRAMMABLE WIRELESS HEADSET SYSTEM FOR CORDLESS TELEPHONE

FIELD OF THE INVENTION

This invention relates to telephone headsets and more particularly to a programmable wireless headset system for cordless telephones.

BACKGROUND ART

Headsets offer the convenience of hands free telephone conversation. Many cordless handsets and cellular telephones include a headset jack for connection of a wired headset. Wired headsets require the user to carry the handset around.

"Bluetooth" is a short range wireless standard. Some cellular telephone are Bluetooth enabled. Such cellular telephones call use a wireless Bluetooth headset. The few available Bluetooth enabled cordless telephones are expensive. Generally, the Bluetooth headsets currently available, based on the Bluetooth standard, have a range of only about 10 meters.

Known wireless headsets for cordless telephones do not communicate directly with the base station of the cordless telephone. These headsets require a separate base portion that connects by wire to the telephone handset or base station. These headsets require a transceiver in both the base portion and the headset, are relatively expensive, and generally inconvenient to use.

DISCLOSURE OF THE INVENTION

A programmable wireless headset system includes a headset and a base. The headset has a microphone, a speaker, a battery, a headset connector, a programmable portion and a transceiver. The base has a programming portion, one or more input keys or switches, a display, and a base connector that can be connected to the headset connector. The base also includes a charging circuit and an input power connector. The programming portion has memory with codes for a plurality of different brands and models of cordless telephones, and a data record for each code. In response to a code input by a user, the programming portion utilizes the respective data record to program the programmable portion in the headset so that the headset can communicate directly with the base station of a selected telephone, allowing hands free use of the telephone. The programming portion can also be incorporated into the headset.

BRIEF DESCRIPTION OF THE DRAWINGS

Details of this invention are described in connection with the accompanying drawings that bear similar reference numerals in which.

DETAILED DESCRIPTION OF THE INVENTION

Figure 1:
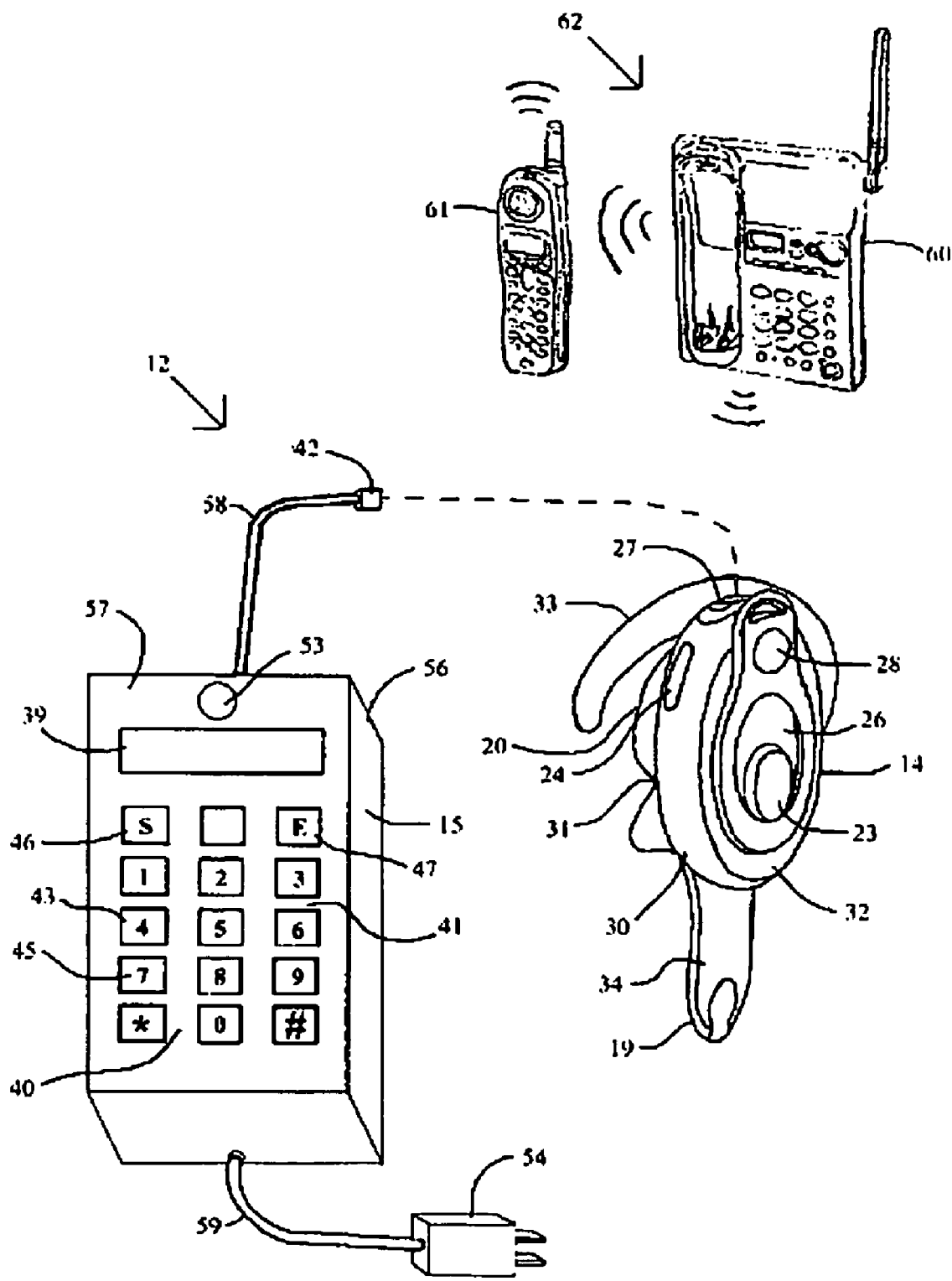
FIG. 1 is a perspective view of a headset system embodying features of the present invention.
Figure 2:
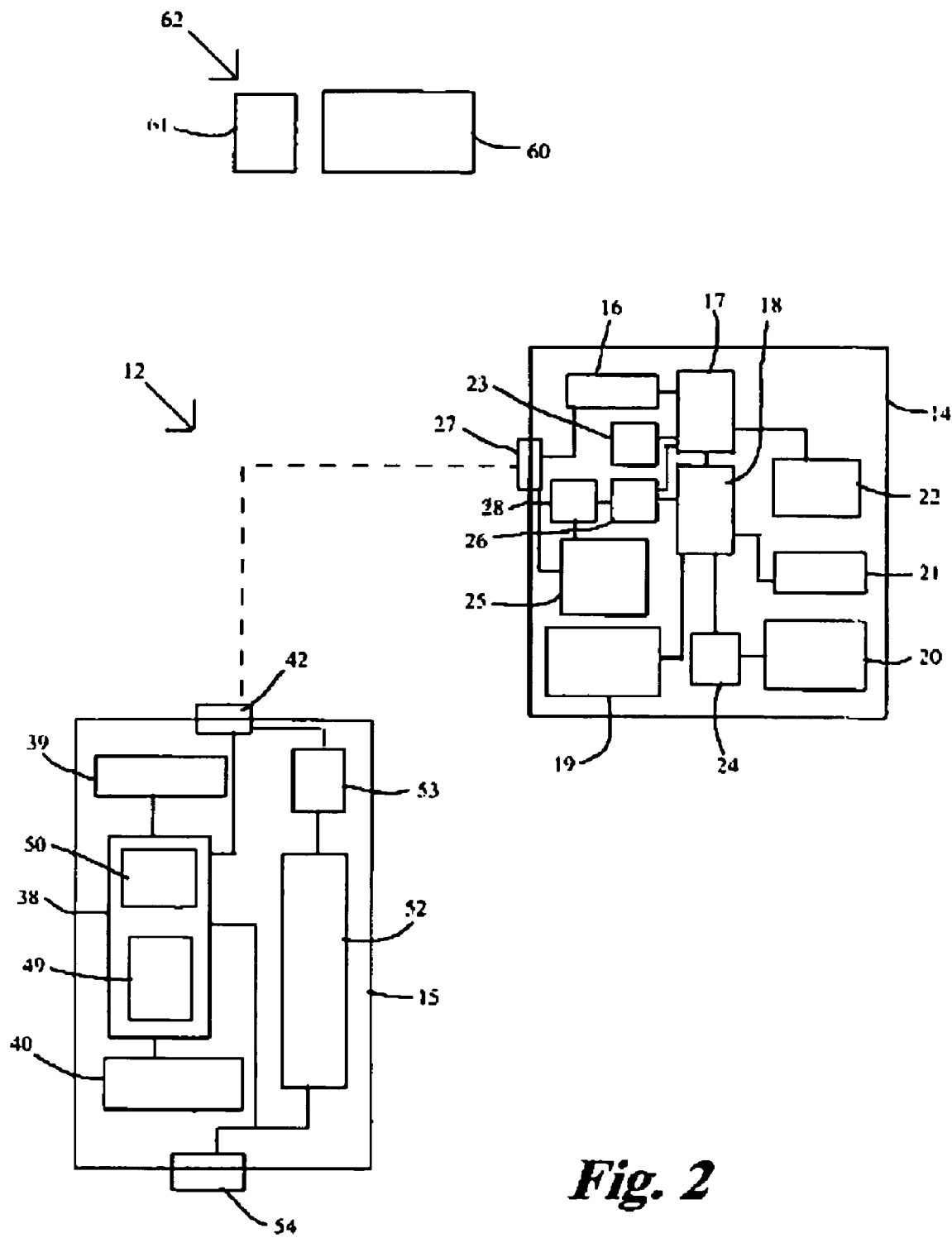
FIG. 2 is a schematic view of the system of FIG. 1.

Referring to FIGS. 1 and 2, a programmable wireless headset system 12 includes a headset 14 and a base 15. The headset 14 has a programmable portion 16, a transceiver 17, an audio amplifier 18, a microphone 19, a speaker 20, a ringer 21, an antenna 22, a hook switch 23, a volume control 24, a battery 25, an indicator 26, a headset connector 27 and an on/off switch 28. The antenna 22 is connected to the transceiver 17. The hook switch 23 is connected to the transceiver 17. The battery 25 is connected through the on/off switch 28 and the indicator 26 to the transceiver 17 and the audio amplifier 18.

The transceiver 17 is connected to the audio amplifier 18. The audio amplifier 18 is connected to the microphone 19, volume control 24 and the ringer 21. The speaker 20 is connected to the volume control 24. The headset connector 27 is connected to the battery 25 and the programmable portion 16. The programmable portion 16 is connected to the transceiver 17. The programmable portion 16, transceiver 17 and audio amplifier 18 can be combined in a single integrated circuit, can each be individual integrated circuits, or any combination.

The headset 14 shown includes a case 30 having an elongated, flat ovoid shape with an inner face 31 and an outer face 32. The speaker 20 faces inwardly from the inner face 31. The hook switch 23, indicator 26 and on/off switch 28 are mounted on the outer face 32. The volume control 24 mounts along a side of the case 30. A boom 33 extends downwardly from the case 30, with the microphone 19 mounting in the lower end of the boom 33. An ear clip 34 is sized and shaped to fit over a human ear. The ear clip 34 attaches to a side of the case 30, projecting upwardly and around therefrom. The headset connector 27 faces upwardly from an upper end of the case 30. The transceiver 17, audio amplifier 18, and battery 25 are enclosed in the case 30. Although the headset 14 shown is an over-the-ear type, with the ear clip 34, other configurations can be used.

The base 15 includes a programming portion 38 connected to a display 39, a means for receiving input 40, shown as a keypad 41, and a base connector 42. The base connector 42 is selectively connectable to the headset connector 27. The means for receiving input 40 includes at least one switch or key 43. The keypad 41 shown includes a plurality of keys 43, including digit keys 45 for the digits 0 to 9, designated by numerals 0 to 9, a select key 46, designated by the letter S and an enter key 47, designated by the letter E. The programming portion 38 has memory 49 and a processor 50.

The memory 49 stores a plurality of codes, a data record for each code, and software instructions for the processor 50. Each code corresponds to a cordless telephone brand and model. When the headset connector 27 is connected to the base connector 42 and a user inputs a selected code through the keypad 41, the programming portion 38 utilizes the data record associated with the entered code to program the programmable portion 16 to control the transceiver 17 to communicate with a cordless telephone of the brand and model corresponding to the selected code.

The base 15 also includes a charging circuit 52 connected to the base connector 42, a charging indicator 53 connected to the charging circuit 52 and an input power connector 54 connected to the charging circuit 52. The base 15 shown has an elongated, box shaped housing 56 with a front face 57. The charging indicator 53, display 39 and keypad 41 are mounted on the front face 57. The programming portion 38 and the charging circuit 52 are housed in the housing 56. The base connector 42 is shown connected to a first cord 58 that extends from one end of the housing 56 and the input power connector 54 is shown connected to a second cord 59 that extends from the opposite end of the housing 56.

The programming portion 38 and the charging circuit 52 can be provided as separate units. The base 15 with the programming portion 38 and base connector 42 can then be any device with memory and a processor, such as a computer or a personal digital assistant (PDA), and a cable with the appropriate connector.

The three operating frequencies used in the United States for cordless telephones are 900 MHz, 2.4 GHz and 5.8 GHz. The headset 14 is selected for the operating frequency of the cordless telephone that will be used with the headset 14. Once the headset 14 is programmed, the headset 14 communicates directly with the base station 60 of the cordless telephone 62, allowing hands free use of the telephone 62. The headset system 12 of the present invention does not require a separate wired connection to the handset 61 or the base station 60 of the cordless telephone 62.

The headset system 12 can be used with single handset cordless telephones or expandable cordless telephone systems. The headset system 12 can be used concurrently with the handset of a single handset cordless telephone. The headset system 12 is flexible and can provide greater range than available Bluetooth headsets.

Figure 3:
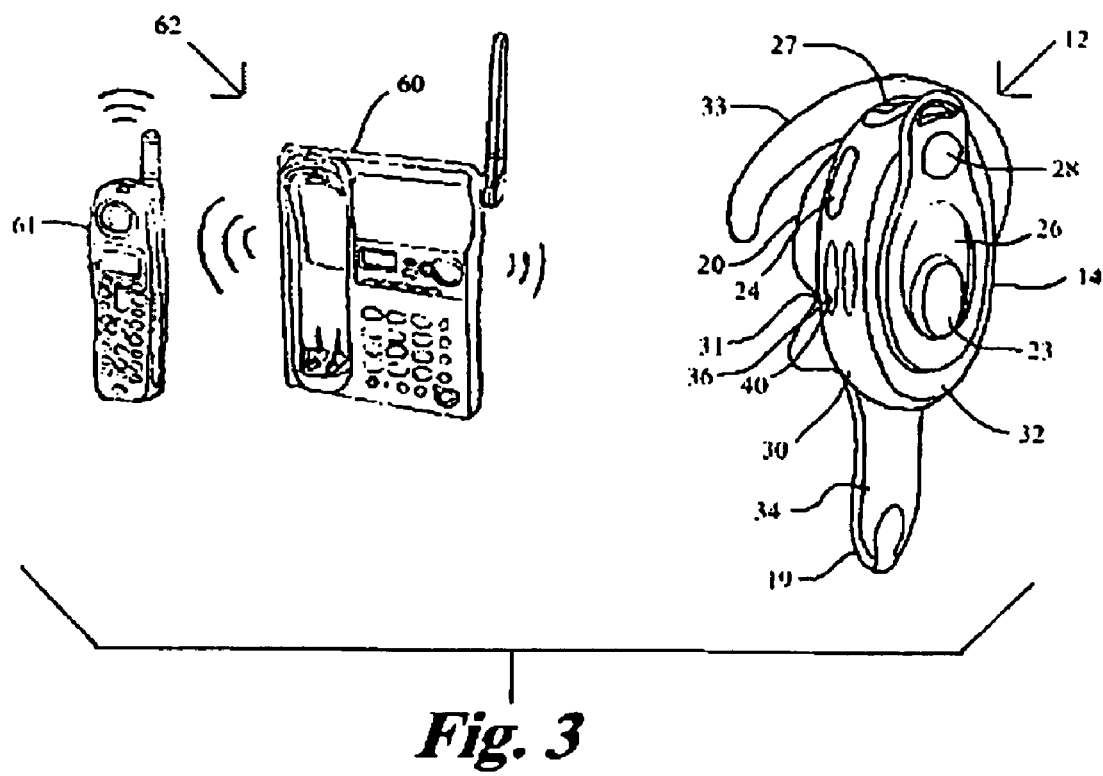
FIG. 3 is a perspective view of the headset system of FIG. 1 with the programming portion in the headset.
Figure 4:
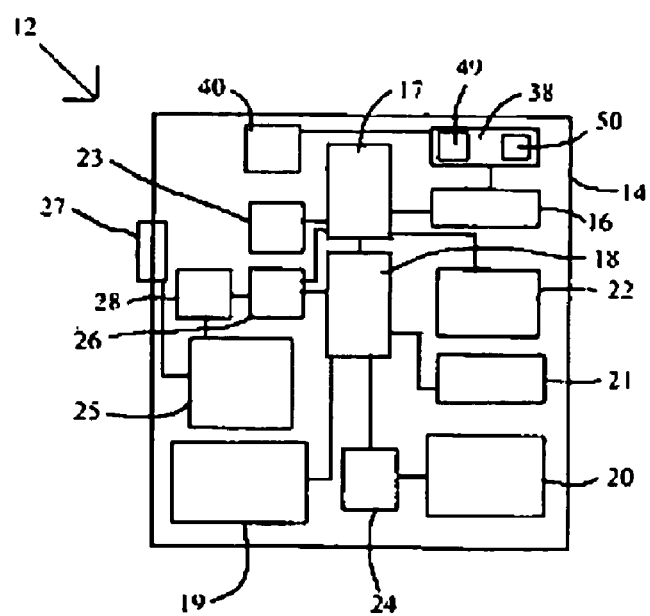
FIG. 4 is a schematic view of the system of FIG. 3.

As shown in FIGS. 3 and 4, instead of providing a separate base 15 for the programming portion 38, the programming portion 38 can be incorporated into the headset 14. The programming portion 38 is enclosed in the case 30 and is connected directly to the programmable portion 16. The means for receiving input 40 is connected to the programming portion 38. The means for receiving input 40 shown includes at least one input button 36 mounted along a side of the case 30. When a user inputs a selected code through the input buttons 36, the programming portion 38 utilizes the data record associated with the entered code to program the programmable portion 16 to control the transceiver 17 to communicate with a cordless telephone of the brand and model corresponding to the selected code.

Although the present invention has been described with a certain degree of particularity, it is understood that the present disclosure has been made by way of example and that changes in detail of structure may be without departing from the spirit thereof.

What is claimed is:

1. A programmable wireless headset system for a cordless telephone having a base station connected to a telephone line and a handset, comprising:
   a headset including a microphone, a speaker, a programmable portion, and a transceiver connected to said microphone, said speaker and said programmable portion, said programmable portion being programmable to enable said transceiver to wirelessly communicate directly with different model cordless telephone base stations made by different manufacturers, and
   a programming portion connectable to said programmable portion,
   whereby said programming portion programs said programmable portion to enable said transceiver to communicate with said base station of said cordless telephone, for hands free use of said cordless telephone.

2. The system as set forth in claim 1:
   including a base having said programming portion and a base connector connected to said programming portion, and
   wherein said headset includes a headset connector connected to said programmable portion and connectable to said base connector,
   whereby when said headset connector is connected to said base connector, said programming portion can program said programmable portion to control said transceiver to communicate with said base station of said telephone, for hands free use of said telephone.

3. The system as set forth in claim 2 wherein said base includes means, connected to said programming portion, for receiving input,
   whereby when said headset connector is connected to said base connector and said means for receiving input receives selected input, said programming portion programs said programmable portion.

4. The system as set forth in claim 3 wherein said means for receiving input includes at least one electrical switch.

5. The system as set forth in claim 3 wherein said means for receiving input includes a keypad.

6. The system as set forth in claim 5 wherein said keypad includes digit keys corresponding to the digits 0 to 9, a select key and an enter key.

7. The system as set forth in claim 3 wherein said programming portion includes memory, said memory including a plurality of codes and a data record for each said code, with each said data record corresponding to a brand and model of cordless telephones,
   whereby when said means for receiving input receives a selected code, said programming portion programs said programmable portion in relation to said data record for said selected code.

8. The system as set forth in claim 3 wherein said base includes a display for displaying input received by said means for receiving input.

9. The system as set forth in claim 2 wherein:
   said headset includes a rechargeable battery connected to said headset connector and said transceiver, and
   said base includes a charging circuit connected to said base connector, and an input power connector connected to said charging circuit, for connecting said charging circuit to a power source,
   whereby when said headset connector is connected to said base connector, said charging circuit charges said, rechargeable battery.

10. The system as set forth in claim 9 wherein said base includes a charging light connected to said charging circuit for indicating when said rechargeable battery is charging.

11. The system as set forth in claim 1 wherein said programming portion is included in said headset and connected to said programmable portion.

12. The system as set forth in claim 11 wherein said headset includes means, connected to said programming portion, for receiving input,
   whereby when said means for receiving input receives selected input, said programming portion programs said programmable portion.

13. The system as set forth in claim 12 wherein said means for receiving input includes at least one electrical switch.

14. The system as set forth in claim 1 wherein said headset includes a hook switch for answering a telephone call.

15. The system as set forth in claim 1 wherein said headset includes a volume control connected to said speaker.

16. A programmable wireless headset system for a cordless telephone having a base station connected to a telephone line and a handset, comprising:
   a headset including a microphone, a speaker, a headset connector, a programmable portion, transceiver, a battery, a hook switch, and a volume control, said transceiver being connected to said programmable portion, said microphone and said volume control, said volume control being connected to said speaker, said programmable portion being connected to said headset connector, said battery being connected to said headset connector, said programmable portion being programmable to enable said transceiver to wirelessly communicate directly with different model cordless telephone base stations made by different manufacturers, and a base including a programming portion, a base connector connected to said programming portion, a keypad connected to said programming portion, a display connected to said programming portion, a charging circuit connected to said base connector, a power input connector connected to said charging circuit, and a charging light connected to said charging circuit, said programming portion including memory, said memory including a plurality of codes and a data record for each said code, with each said data record corresponding to a brand and model of cordless telephones, said base connector being connectable to said headset connector, whereby when said headset connector is connected to said base connector, said programming portion programs said programmable portion to enable said transceiver to communicate with said base station of said cordless telephone, for hands free use of said cordless telephone, and said charging circuit charges said battery.

17. A programmable wireless headset system for a cordless telephone having a base station connected to a telephone line and a handset, comprising:

a headset including a microphone, a speaker, a headset connector, a programmable portion, a programming portion, an input button, a transceiver, a battery, a hook switch, and a volume control, said transceiver being connected to said programmable portion, said battery, said microphone and said volume control, said volume control being connected to said speaker, said programmable portion being connected to said programming portion, and said programming portion being connected to said input button, said programmable portion being programmable to enable said transceiver to wirelessly communicate directly with different model cordless telephone base stations made by different manufacturers, said programming portion including memory, said memory including a plurality of codes and a data record for each said code, with each said data record corresponding to a brand and model of cordless telephones, whereby said programming portion programs said programmable portion to enable said transceiver to communicate with said base station of said cordless telephone, for hands free use of said cordless telephone.

* * * * *